United States Patent [19]
Pappalardo et al.

[11] 3,928,820
[45] Dec. 23, 1975

[54] HIGH GAIN PULSED ION LASER

[75] Inventors: Romano G. Pappalardo, Sudbury; Robert Smith, Wilmington, both of Mass.

[73] Assignee: GTE Laboratories Incorporated, Waltham, Mass.

[22] Filed: Nov. 25, 1974

[21] Appl. No.: 526,646

[52] U.S. Cl. .......................................... 331/94.5 G
[51] Int. Cl.² .......................................... H01S 3/03
[58] Field of Search .................... 331/94.5; 330/4.5

[56] References Cited
UNITED STATES PATENTS
3,798,486   3/1974   Hernquist .................. 331/94.5 D

OTHER PUBLICATIONS

Heard et al., Visible Laser Transitions in Ionized Oxygen, Nitrogen, and Carbon Monoxide, Proc. IEEE, Vol. 52, (Oct. 1964), p. 1258.
McFarlane, Laser Oscillation on Visible and Ultraviolet Transitions of Singly and Multiply Ionized Oxygen, Carbon, and Nitrogen, App. Phys. Lett., Vol. 5, No. 5, (Sept. 1, 1964), pp. 91–93.
Bridges et al., Visible and UV Laser Oscillation at 118 Wavelengths in Ionized Neon, Argon, Krypton, Xenon, Oxygen, and other Gases, Applied Optics, Vol. 4, No. 5, (May 1965), pp. 573–580.

*Primary Examiner*—William L. Sikes
*Attorney, Agent, or Firm*—Irving M. Kriegsman

[57] ABSTRACT

A high gain pulsed ion laser is described in which a short discharge pulse of less than about 2.0 microseconds is applied to a discharge tube in which oxygen is present in an amount sufficient to establish an oxygen pressure in the range between about 10 and 100 millitorr. The pulsed output from the ion laser occurs during the "afterglow" of the discharge pulse and is attributed to doubly ionized oxygen. The wavelength of the output may be selected from certain lines in the visible and ultraviolet portions of the electromagnetic spectrum.

11 Claims, 6 Drawing Figures

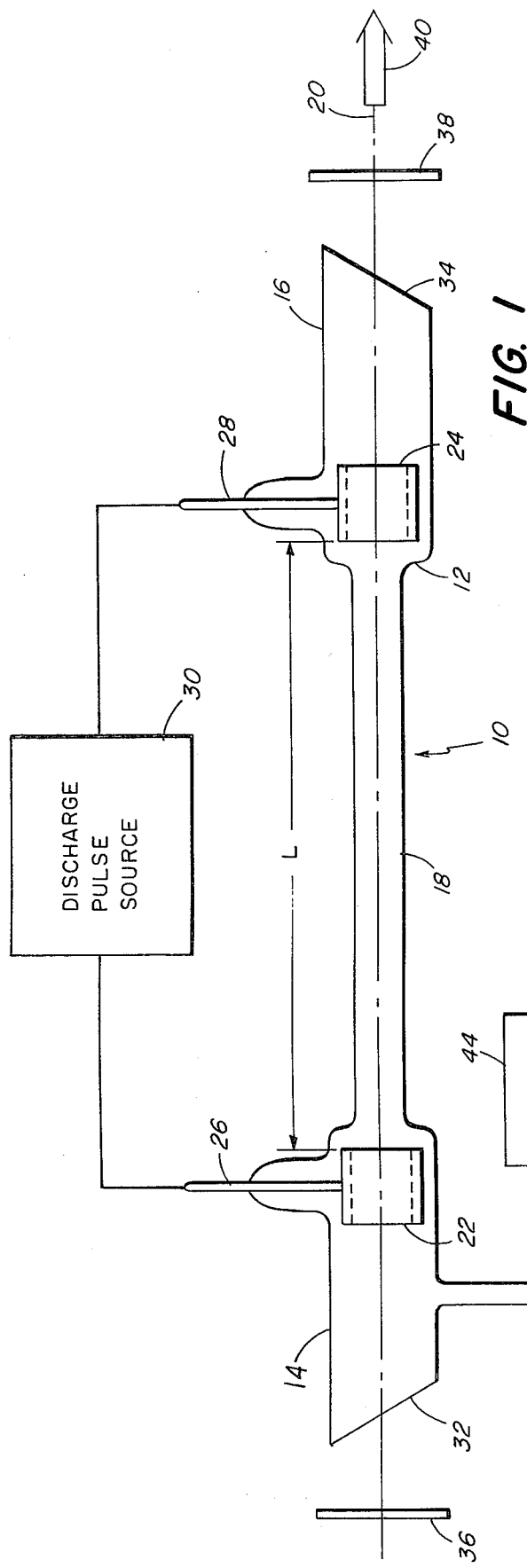
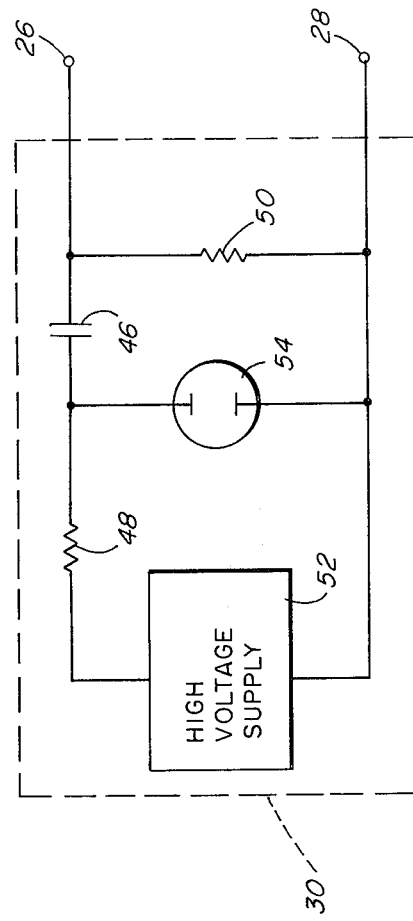

HIGH GAIN PULSED ION LASER

The Invention herein described was made in the course of or under a contract, or subcontract thereunder, with the United States Navy.

BACKGROUND OF THE INVENTION

The present invention is related generally to lasers and is more particularly concerned with a novel high gain pulsed ion laser having an ionized oxygen active medium.

Recently, a great amount of funds and effort have been expended in research and development projects involving lasers. These projects may be divided into two somewhat interrelated categories. First, many projects have dealt with the incorporation of lasers into industrial, medical and scientific devices and systems. Second, a continuing search is maintained for new laser sources. This search is done both to widen the number of available wavelengths at which laser emissions may be generated and to acquire laser sources having superior operating parameters.

Oxygen ion lasers have been reported in the literature for some years. However, all such reports have merely confirmed that a laser output may be attained from a laser utilizing ionized oxygen as the active medium. Such prior art oxygen ion lasers have utilized both singly and doubly ionized oxygen. Several such reports are as follows: "Laser Oscillation on Visible and Ultraviolet Transitions of Singly and Multiply Ionized Oxygen, Carbon, and Nitrogen," by R. A. McFarlane, Applied Physics Letters, Vol. 5, No. 5, pp. 91–93, September 1964; "Spectroscopy of Ion Lasers," by W. B. Bridges et al., IEEE Journal of Quantum Electronics, Vol. QE-1, No. 2, pp. 66–84, May 1965; "Visible and uv Laser Oscillation at 118 Wavelengths in Ionized Neon, Argon, Krypton, Xenon, Oxygen, and Other Gases," by W. B. Bridges et al., Applied Optics, Vol. 4, No. 5, pp. 573–580, May 1965; and "New 0 II 6640-A Laser Line," by M. Birnbaum et al., IEEE Journal of Quantum Electronics, Vol. QE-7, No. 5, p. 208, May 1971.

Where the experimental conditions are reported, they are quite consistent, for example, McFarlane used a laser employing a Brewster window structure with a discharge tube 7 millimeters i.d. and 1 meter long. Oscillation was observed with gas pressures between 20 and 50 millitorr and with pulse currents in excess of 500 amperes from the discharge of a 2-$\mu$F condenser and where the pulse lasted approximately 20 microseconds and was repeated several times per second. Also, where reported, the reflectivities of the cavity mirrors is maintained at very high levels, e.g., 97 percent reflective or higher.

No report as yet has attributed performance to either singly or doubly ionized oxygen which would cause the pulsed oxygen ion lasers to be considered in the first class of projects discussed above. Bridges et al., in the IEEE Journal of Quantum Electronics publication prognosticate only that certain singly ionized lines have potential technological application. A. W. Tucker et al., "Pulsed-Ion Laser Performance in Nitrogen, Oxygen, Krypton, Xenon, and Argon," IEEE Journal of Quantum Electronics, Vol. QE-10, No. 1, January 1974, have reported the relative peak powers attainable with a group of pulsed ion lasers operating between 350 and 460 nanometers. The group of singly ionized oxygen lines touted by Bridges et al., exhibit peak powers measured between 0.4 and 5.9 watts, whereas the xenon line at 364.5 nanometers was reported to have a peak power of the order of 200 watts.

SUMMARY OF THE INVENTION

Accordingly, it is an object of the present invention to provide a novel pulsed oxygen ion laser capable of operating at high gain.

It is a second object of the invention to provide such a pulsed oxygen ion laser which is capable of operating at peak powers sufficiently high to be of technological value.

Briefly, the invention in its broadest apect comprises a high gain pulsed ion laser. A cylindrical discharge tube is provided which has a centrally located axis therethrough. A pair of electrodes are disposed within the cylindrical discharge tube, one located effectively near each end of the cylindrical discharge tube. The electrodes are open at least at the axis of the cylindrical discharge tube. An amount of oxygen is within the cylindrical discharge tube sufficient to establish an oxygen pressure therein in the range from about 10 to about 100 millitorr. A pair of reflective elements are disposed essentially normal to the axis of the cylindrical discharge tube adjacent to the respective ends thereof. The pair of reflective elements are spaced from each other so as to establish a resonant cavity therebetween at a wavelength at which doubly ionized oxygen can be caused to emit laser radiation. One of the reflective elements is partially transparent at the laser wavelength. A voltage source is connected across the electrodes to provide a discharge pulse having a duration less than about 2.0 microseconds whereby a high gain pulse of light at the doubly ionized oxygen emission wavelength is emitted through the partially transparent reflective element after the end of the discharge pulse.

Further objects, advantages and features of the invention will be apparent from the following detailed description of the preferred embodiments taken together with the accompanying drawing.

BRIEF DESCRIPTION OF THE DRAWING

In the Drawing:

FIG. 1 is a partially schematic side view of a high gain pulsed ion laser according to the invention;

FIG. 2 is a schematic diagram of a source of suitable discharge pulses for use in the apparatus of FIG. 1.

DETAILED DESCRIPTION OF THE PREFERRED EMBODIMENTS

Figure 3:
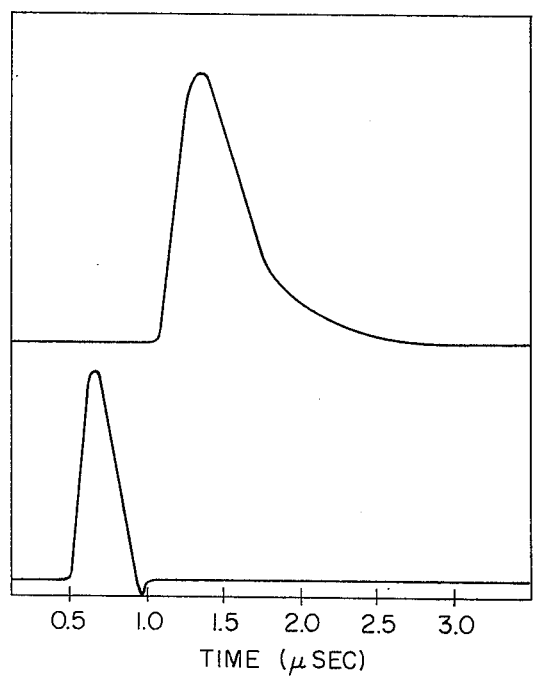
FIG. 3 is a graphical representation showing the sequential relationship of current and laser pulses in the apparatus of FIG. 1.

In referring to the various figures of the drawing hereinbelow, like reference numerals will be utilized to refer to identical parts of the apparatus.

Referring initially to FIG. 1, where is shown a preferred embodiment of a high gain pulsed ion laser according to the present invention which is designated generally by the reference numeral 10. The laser includes a cylindrical discharge tube 12 having enlarged end portions 14 and 16 and a constant cross section portion 18 in the center thereof. A central axis 20 corresponding to the cylindrical axis extends longitudinally through the discharge tube 12.

The enlarged end portions 14 and 16 of the discharge tube 12 each serve to house one of a pair of electrodes 22 and 24 respectively. The hollow electrodes in this embodiment are of cylindrical form and are disposed coaxially within the discharge tube 12. The pair of electrodes 22 and 24 define a discharge length L therebetween. The electrodes 22 and 24 are attached to a pair of feedthrough posts 26 and 28 respectively which provide a means for externally applying a voltage that produces a discharge pulse across the electrodes. A discharge pulse source 30 is connected across the posts 26 and 28 and will be described more fully hereinbelow.

In addition, the enlarged end portions 14 and 16 are terminated at their distal ends by a pair of windows 32 and 34 respectively which are inclined to the axis 20 at Brewster's angle to minimize reflective losses. Outside of the windows 32 and 34 are a pair of reflective elements 36 and 38 which are centered generally on the axis 20 and which intersect the axis 20 essentially normal thereto. Within the purview of the invention, the reflective elements 36 and 38 may have either planar or spherical reflective surfaces. One of the reflective elements, e.g., element 38, is partially transparent so that the output from the apparatus 10 may be coupled out of the cavity. This is represented by the arrow 40. Generally, the reflective elements are dielectrically coated mirrors selected for their performance at a specific wavelength of interest.

The end portion 14 has a tube 42 extending therefrom to a pump 44. The pump 44 is utilized to control the pressure of the gas fill within the cylindrical discharge tube 12.

The pulsed discharge through the discharge tube 12 may be obtained from the circuit shown in FIG. 2. A capacitor bank 46 is charged at high voltages from a source 52 via a charge resistor 48 and a bleeding resistor 50. In the charging process, both the discharge tube 12 and a triggered spark-gap 54 act as infinite impedances. Upon application of an external pulse to the grid of the spark-gap 54, the voltage across the capacitor bank 46 is applied suddenly across the discharge tube via post connections 26 and 28. Once the gas in the tube becomes ionized, the impedance of the discharge tube 12 becomes much smaller than that of the bleeding resistor 50 and most of the current flows through the discharge tube 12. The capacitor in our measurements has been varied from 3.5 to 11 nF. The charge voltage has been varied from 10 to 30 kV. The laser emission wavelength is measured by means of a Jarrel-Ash one meter grating spectrometer, while the temporal development of the laser pulse is measured with a fast photodiode (ITT FW 114) and a double trace oscilloscope. The current pulse is measured with a Pearson current transformer Model 411 with a 0.1V/A sensitivity and a nanosecond risetime. The spark-gap used in our preferred arrangement is an EGG model HY-32 spark-gap.

The gas fill within the discharge tube 12 has at least a portion thereof which is oxygen. The oxygen pressure in the discharge tube 12 is within the range from about 10 to about 100 millitorr whether the fill is essentially 100 percent oxygen or whether it is a mixed fill with a noble gas or simply air. As stated previously, the oxygen pressure is maintained by the pump 44 at the desired pressure. With the longest tube used, the best pressure was typically 40 millitorr. A typical current pulse, when operating a 75 centimeter long discharge tube, has the following characteristics. On discharging 11 nF charged at 23 kV through 22 millitorr of oxygen, the current pulse has an approximately trangular shape with a rounded top; its duration is 500 nanoseconds, the FWHM is 350 nanoseconds; the risetime is approximately 80 nanoseconds; and the peak intensity is 1250 A. However, it is within the purview of the invention to use discharge pulses as long as about 2.0 microseconds. A typical such pulse is shown as the bottom curve in FIG. 3.

A strikingly high gain is exhibited by the 5592 A laser line of doubly ionized oxygen (0(III)), when the current pulse in the discharge is shorter than a typical relaxation time of the excited electronic state, in the neighborhood of 0.75 microseconds. Under these conditions, lasing can even be obtained from a discharge length of 15 centimeters and with the two mirrors completing the cavity each having a 50 percent reflectivity at the laser wavelength. For laser action to occur in this case, the gain constant of the oxygen plasma must be at least 4.6% cm$^{-1}$ simply to overcome the mirror losses. High gain is also found on some ultraviolet lines in the 3750 A region; namely, the two known lines at 3754.6 A and at 3759.8 A (transition 2p ($^2P^o$) 3p $^3D_2 \rightarrow$ 2p ($^2P^o$)3s $^3P_1^o$ and the corresponding $^3D_3 \rightarrow$ $^3P_2^o$ transition). The short pulse excitation also produces two new laser lines in the ultraviolet (0(III)) transitions 2p ($^2P^o$)3p $^3D_1 \rightarrow$ 2p($^2P^o$)3s $^3P_0^o$ at 3757.2 A and the corresponding $^3D_1 \rightarrow$ $^3P_1^o$ transition at 3773.8 A).

The exceptionally high gain observed in the oxygen discharge is associated in part with the afterglow character of the laser emission. In fact, laser emission both in the ultraviolet and visible lines of 0(III) under short pulse excitation occurs only after the current pulse is completely extinguished. Since laser emission occurs when the plasma is relatively cold, the losses associated with the plasma scattering are minimized. The afterglow laser emission is due to a slow relaxation in the excited state, from the states reached on electronic excitation down to the emitting levels.

The following table gives dimensions of a number of discharge tubes in which successful results have been achieved.

| Tube | Discharge Length L (cm) | Bore (mm) | Electrodes |
| --- | --- | --- | --- |
| A | 75 | 8 | a |
| B | 33 | 8 | b |
| C | 15 | 8 | a |
| D | 21 | 4 | b |
| E | 13 | 2 | a |
| F | 16 | 2.4 | b |

(a) Oxide coated cathodes in tube side arms.
(b) Stainless steel, hollow, cylindrical electrodes, coaxial to tube.

Referring now to FIG. 3 of the drawing, there are shown two curves representing oscilloscope traces of the current discharge pulse, lower curve, and the resulting laser output pulse, upper curve. This result is achieved at the various emission wavelengths associated with doubly ionized oxygen. These wavelengths are in the yellow-green portion of the visible spectrum, 5592 A, and in the ultraviolet, 3754.6 A, 3757.2 A, 3759.8 A, and 3773.8 A.

Figure 4:
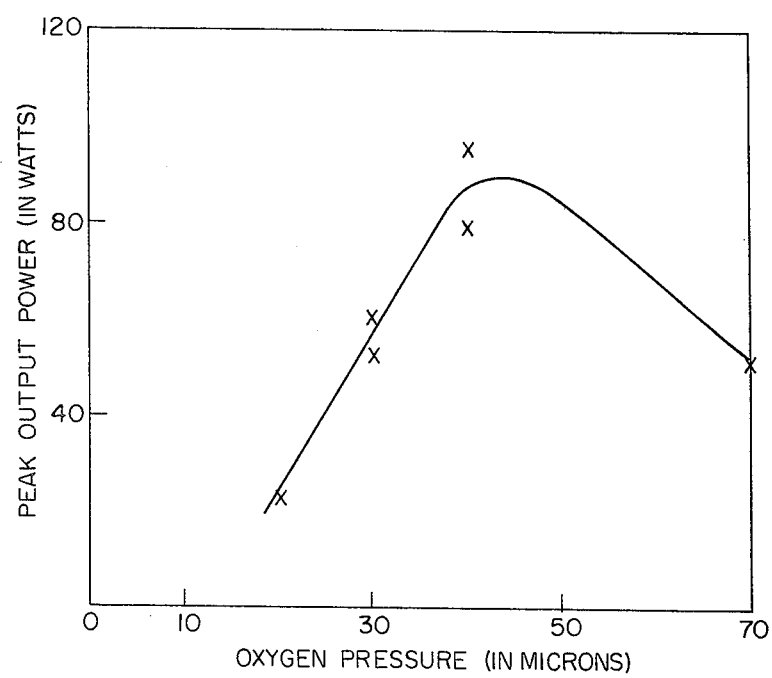
FIG. 4 is a graphical representation showing the effect of oxygen pressure on peak power output.
Figure 5:
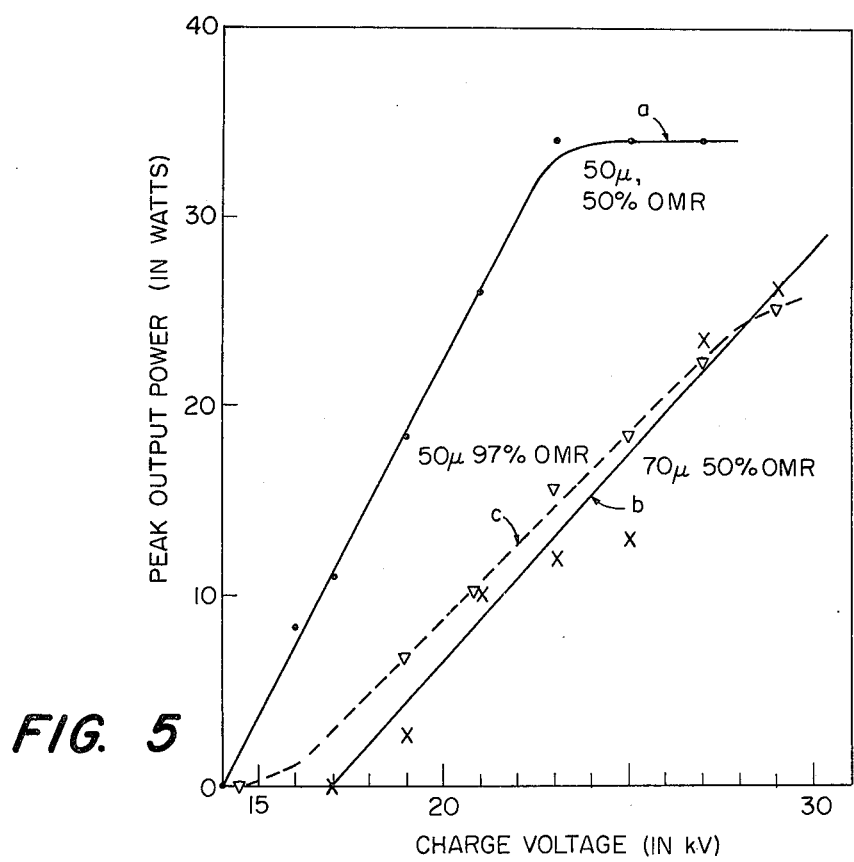
FIG. 5 is a graphical representation showing the effects on peak power output from changes in charge voltage, oxygen pressure, and output mirror reflectivity.

The laser pulse starts generally when the current pulse is completely extinguished; therefore, the laser action is an "afterglow" effect. This is shown in FIG. 3 for the longest tube (A). With the shorter tube (B), contraction by roughly a factor of 2 in the duration of the current pulse causes a corresponding shortening in the laser pulse, but not in the time delay between the current pulse peak and the laser pulse peak. The peak power of FIG. 3, namely 96 watts, corresponding to a pulse energy of 50 microjoules is obtained in tube A with one broadband (465 to 690 nanometer) maximum reflectivity mirror and a 5 percent transmitting output mirror. The optimum pressure under these conditions was around 40 millitorr, as shown in FIG. 4, where the effect of gas fill pressure on peak output power is plotted at constant excitation energy. No systematic optimization of the output mirror reflectivity has been carried out at any tube length and can be expected to improve the results already attained. The output power generally does not show saturation with tube length, but continued to increase, at least up to the tube lengths used. FIG. 5 of the drawing illustrates the combined effects of the variance of a number of parameters, namely oxyen pressure, charge voltage, and output mirror reflectivity. It should be noted here that, at 50 millitorr oxygen pressure, the output vs. voltage curves have an extended linear range, different slopes, and the output with a 50 percent transmitting mirror always exceeds that with a 97 percent transmitting mirror.

In the ultraviolet, generally, two laser lines are observed, one at 3754.6 A and another at 3759.8 A. Two additional lasing lines at 3757.2 A and 3773.8 A are observed in the longest tube. The oxygen pressure range for lasing is similar to that for the visible line, although in the longest tube optimum pressures were lower, namely about 20 millitorr. The two intense components of the lasing group are found for all tubes.

Figure 6:
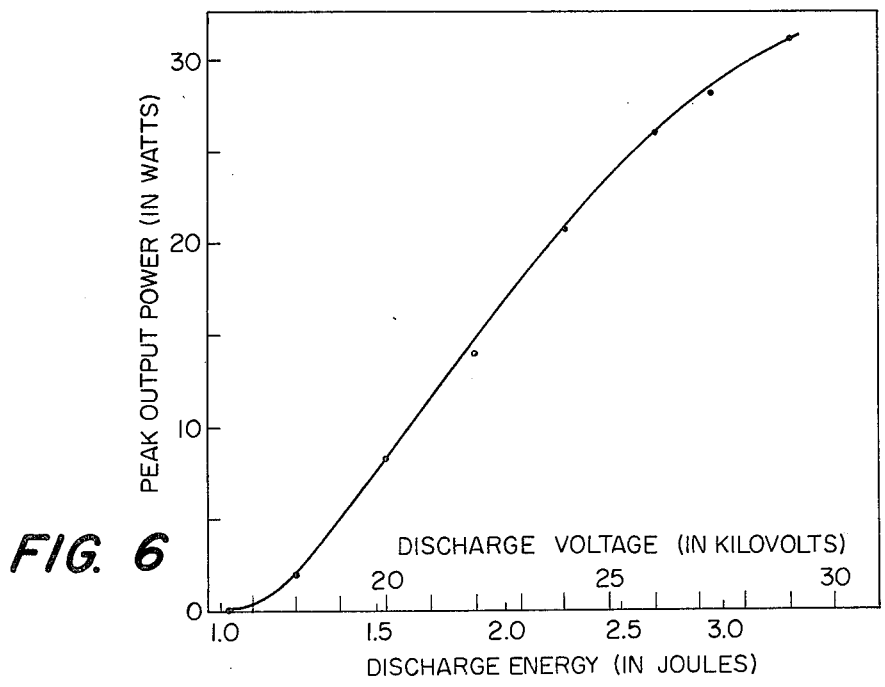
FIG. 6 is a graphical representation showing the relationship between peak power output in the ultraviolet and discharge voltage for the apparatus of FIG. 1.

The time development of the laser pulse follows the same pattern observed for the 0(III) laser transition at 5592 A; namely, lasing starts only when the current pulse is extinguished completely. The laser pulse delay (time lag between current pulse peak and laser pulse peak) is about 1.6 microseconds near the threshold and decreases gradually above the treshold to 0.75 microseconds. The peak output power of the ultraviolet laser pulse for tube A is rather insensitive to pressure in the 20 to 40 millitorr range. When both cavity mirrors have a 95 percent reflectivity at approximately 3750 A, the output of one side of the cavity is plotted in FIG. 6 for a 22 millitorr oxygen pressure. For most of the range of excitation voltages, the peak power increases linearly with applied voltage. Beyond 25 kV the curve slope decreases.

In addition, the fill may, within the purview of the invention, be a mixed fill of oxygen and other gases. Successful operation of the devices is attained when the mixed fill is used with oxygen and a gas selected from the group consisting of neon, argon, xenon, helium, and nitrogen (generally in the form of air). The following table gives pressure values for a typical selection of mixed fills.

| Example | Fill Gases | Oxygen Pressure (Millitorr) | Added Gas Pressure (Millitorr) |
|---------|-----------|------------------------------|-------------------------------|
| 1 | O,Ne | 10 | 100 |
| 2 | O,Ar | 50 | 10 |
| 3 | O,Xe | 50 | 10 |
| 4 | O,Xe | 25 | 5 |
| 5 | O,He | 30 | 30 |
| 6 | O,He | 12.5 | 12.5 |
| 7 | Air | 20 | 80 |

In such mixed fill arrangements, generally a sequential laser pulse effect is achieved. That is, the two component gases can be made to lase during the same discharge pulse. In a typical case of xenon-oxygen mixtures, xenon starts lasing in the green Xe(IV) lines at the peak of the current pulse, while laser emission from oxygen occurs later in the afterglow. Similar effects were found in the argon-oxygen mixtures, although in the case of argon the emitting species is the singly ionized atom and not the triply ionized atom, as in the case of xenon. A discharge in these gas mixtures can be used directly in kinetic spectral studies, with the laser pulse from the added gas constituents acting as an excitation pulse and the delayed laser emission from oxygen acting as a probe beam.

Furthermore, the apparatus of the present invention can be operated at repetition rates at least as high as 100 pulses per second in both the visible and ultraviolet.

While there have been shown and described what are presently considered to be the preferred embodiments of the invention, it will be obvious to those of ordinary skill in the art that various changes and modifications may be made therein without departing from the spirit of the invention as defined in the appended claims.

We claim:
1. A high gain pulsed ion laser comprising
  a cylindrical discharge tube having a centrally located axis therethrough and being closed at the ends,
  a pair of electrodes within the cylindrical discharge tube, one electrode located effectively near each end of the cylindrical discharge tube, the electrodes being open at least at the axis of the cylindrical discharge tube,
  an amount of oxygen within the cylindrical discharge tube sufficient to establish an oxygen pressure in the discharge tube in the range from about 10 to about 100 millitorr,
  a pair of reflective elements disposed essentially normal to the axis of the cylindrical discharge tube adjacent to the respective ends thereof, the pair of reflective elements being spaced from each other so as to establish a resonant cavity therebetween at a wavelength at which doubly ionized oxygen can be caused to emit laser radiation, and one of the reflective elements being partially transparent at the laser wavelength, and
  a voltage source connected across the electrodes to produce a discharge pulse having a duration less than about 2.0 microseconds whereby a high gain pulse of light at the doubly ionized oxygen emission wavelength is emitted through the partially transparent reflective element after the end of the discharge pulse.

2. A high gain pulsed ion laser according to claim 1, wherein the wavelength is 5592 A.

3. A high gain pulsed ion laser according to claim 1, wherein the reflective elements are spaced such that light at the wavelengths of 3754.6 A, 3757.2 A, 3759.8 A, and 3773,8 A may be coupled out of the laser.

4. A high gain pulsed ion laser according to claim 1, wherein the cylindrical discharge tube also contains a mix gas selected from the group consisting of argon, xenon, neon, helium, and air.

5. A high gain pulsed ion laser according to claim 1, wherein the partially transparent reflective element is at least 50 percent reflective.

6. A high gain pulsed ion laser according to claim 5, wherein the reflective elements are dielectrically coated spherical mirrors.

7. A high gain pulsed ion laser according to claim 5, wherein the reflective elements are located external to the cylindrical discharge tube and the cylindrical discharge tube is closed at the ends by a pair of windows transparent at the wavelength and inclined to the axis at Brewster's angle.

8. A high gain pulsed ion laser according to claim 1, wherein the discharge pulse has a duration of about 0.5 microseconds.

9. A high gain pulsed ion laser according to claim 1, wherein the oxygen pressure is in the range from about 20 millitorr to 40 millitorr.

10. A high gain pulsed ion laser according to claim 1, wherein the source includes means for repetitively applying a voltage across the electrodes at a rate up to about 100 Hertz.

11. A high gain pulsed ion laser according to claim 1, wherein the electrodes are cylindrical and are disposed coaxially in the cylindrical discharge tube.

* * * * *